United States Patent [19]

Hladik et al.

[11] 3,989,562

[45] Nov. 2, 1976

[54] CONTAINER BODY

[75] Inventors: Oldrich Hladik; Vladimir Ort; Vladimir Pechar, all of Prague; Miroslav Mickulecky, Vysoke Myto; Ervin Zerzan, Brandys near Orl.; Bohumir Prebinda, Karvina, all of Czechoslovakia

[73] Assignee: PIKAZ, inzenyrsky podnik, Prague, Czechoslovakia

[22] Filed: Mar. 10, 1975

[21] Appl. No.: 556,722

[52] U.S. Cl. .............................. 156/79; 156/173; 220/9 F; 264/45.1; 264/46.5; 264/46.7; 264/262; 296/23 MC; 428/36; 428/71; 428/310
[51] Int. Cl.² ............................................ B32B 5/20
[58] Field of Search ...................... 156/79, 78, 173; 264/262, 45.1, 45.8, 46.5, 46.7; 296/23 MC; 220/9 F; 428/36, 71, 310

[56] References Cited
UNITED STATES PATENTS

| | | |
|---|---|---|
| 3,289,703 | 12/1966 | Brown .................................. 156/79 |
| 3,366,719 | 1/1968 | Lueders .............................. 264/45.8 |
| 3,423,490 | 1/1969 | Trogdon et al. .................... 264/45.1 |
| 3,432,378 | 1/1969 | Gondeck et al. ..................... 264/261 |
| 3,444,280 | 5/1969 | Pulaski .............................. 264/46.7 |
| 3,706,615 | 12/1972 | Nishiyama et al. ................. 156/173 |
| 3,879,240 | 4/1975 | Wall ....................................... 156/78 |

*Primary Examiner*—Edward G. Whitby

[57] ABSTRACT

A body for a container or for a road or rail vehicle. The body comprises an inner tube formed of a wound laminate of synthetic resin impregnated material; an outer tube formed of a wound laminate of synthetic resin impregnated material and spaced from the inner tube, an insulation material and reinforcing material in the space between the tubes, the tubes insulation material, and reinforcing material all being securely interconnected. The synthetic resin impregnated material preferably comprises filaments and/or fabric.

7 Claims, 11 Drawing Figures

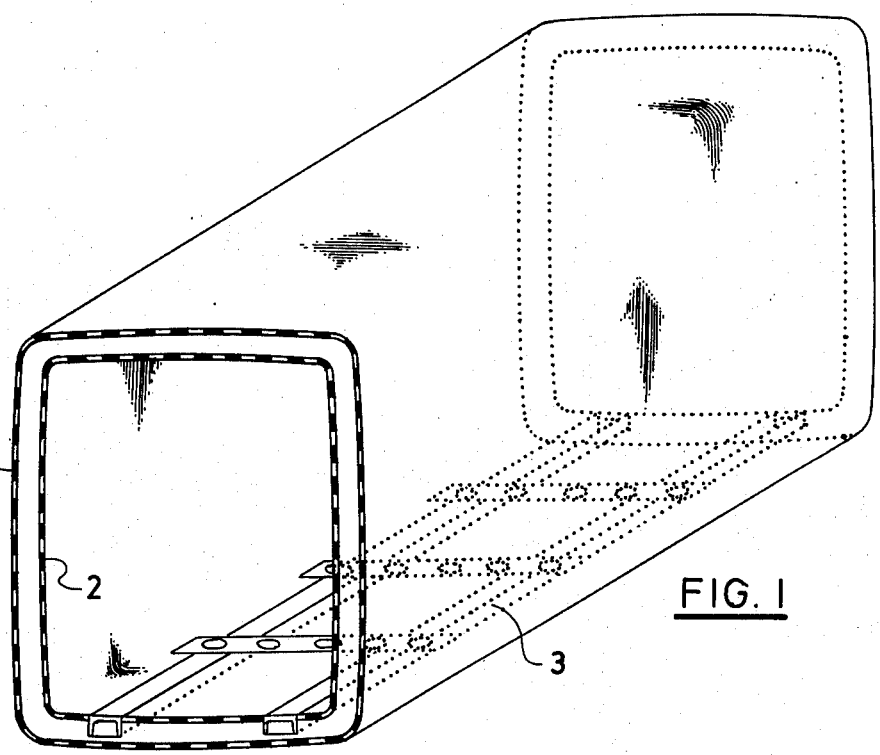
FIG. 1
FIG. 2A
FIG. 2B
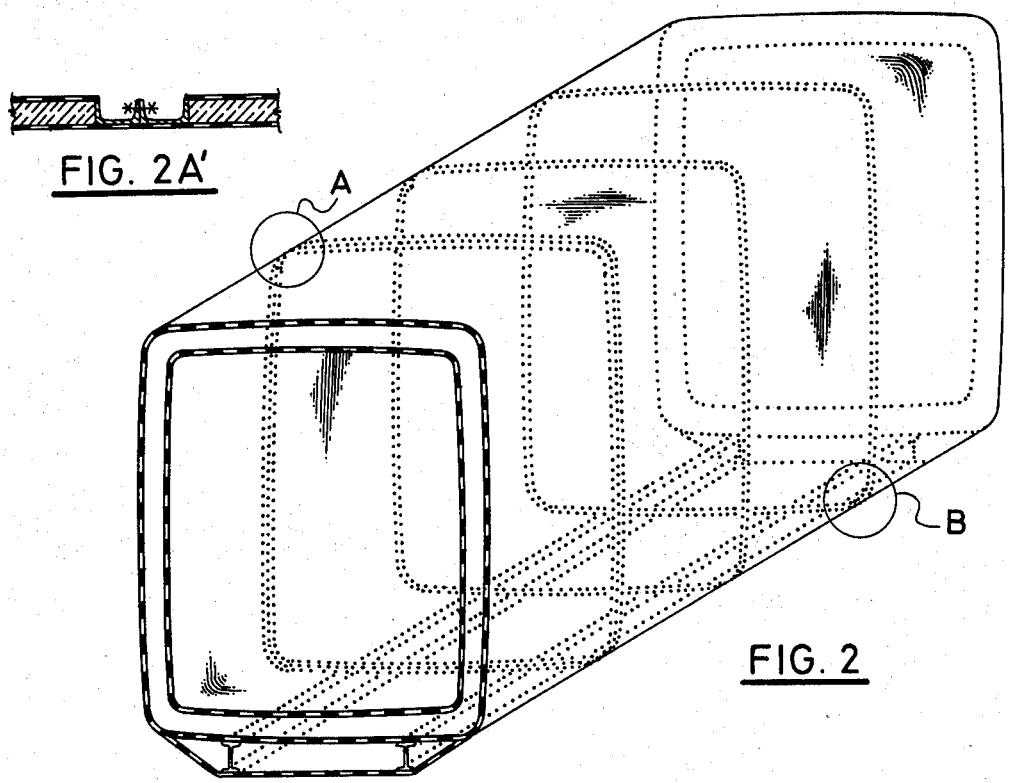
FIG. 2A'
FIG. 2

CONTAINER BODY

This invention relates to a container or a body for a road or rail vehicle.

It is known that such bodies may be made either from conventional materials joined to an insulation filling by a supporting structure, or from sheathing materials consisting of synthetic substances applied to a supporting structure, the fillings being made of an insulating compound or of sandwich materials having an internal filling of the insulating compound, which have likewise been applied to this structure. In all of these cases a self-supporting body is formed; after attachment to a chassis such body forms a conveying space of a road or rail vehicle. The construction of such prior art bodies involves high labor and investment costs.

According to one aspect of this invention there is provided a body for a road or rail vehicle or for a container, the body comprising an inner tube formed of a wound laminate of synthetic resin impregnated material, an outer tube formed of a wound laminate of synthetic resin impregnated material and spaced from the inner tube, and insulation material and reinforcing material in the space between the tubes, the tubes, insulating material, and reinforcing material all being securely interconnected.

The impregnated material may comprise filaments and/or fabric, and for convenience in manufacture the same impregnated material may be used throughout the body.

The reinforcing material may be in the form, for example, of beams, section elements (i.e. elongated elements of uniform cross-section), prisms, grids or honeycombs.

The insulation material may be either a foamed synthetic substance, for example, a rigid light material (polyurethane) or polyvinyl chloride or polystyrene. However, the insulation material is preferably rigid and constitutes the reinforcing material.

If the inner tube is provided with profiling, then the rigidity of the entire body is considerably increased. The formation of reinforcing ribs on the tubes also increases their rigidity, these ribs having been formed on the tubes by a connection such as by means of a laminate and/or by the winding technique. A number of such bodies may be arranged consecutively to form a body unit. This is readily accomplished if these bodies are provided with frame reinforcements which likewise facilitates attachment of end walls and door walls. If such a body is provided from below with a supporting structure or with a frame, which is joined to the body by envelopment with a filament and/or fabric which are impregnated with a synthetic resin, then this represents a very rigid self-supporting structural element.

According to another aspect of this invention, there is provided a method of making a body for a road or rail vehicle or for a container, comprising the steps of winding a plurality of layers of a synthetic resin impregnated material onto a mandrel or former to produce an inner tube; applying reinforcing material and insulation material to the plurality of layers while they are in a partly hardened state; and winding a plurality of layers of a synthetic resin impregnated material therearound to form an outer tube which becomes securely connected to said reinforcing material and said insulation material upon hardening of the synthetic resin of the outer tube.

According to a further aspect of this invention, there is provided a method of making a body for a road or rail vehicle or for a container, comprising the steps of winding a plurality of layers of a synthetic resin impregnated material onto a former to produce an inner tube; applying reinforcing material to the inner tube and winding a plurality of layers of a synthetic resin impregnated material around the reinforcing material to form an outer tube spaced from the inner tube; and then introducing into the space between the tubes a foamed insulation material which upon hardening securely interconnects the tubes and the reinforcing material.

Reference will now be made to specific embodiments of the present invention.

In the manufacture of a body, firstly, a filament and/or fabric impregnated with synthetic resin is wound in several layers, preferably in criss-cross fashion and more preferably with the winding direction being changed by a right angle for each successive layer, onto a former, whereby there is produced an inner tube having, e.g., a generally uniform rectangular or curved cross-sectional configuration as required. If the former is provided with recesses, it is then possible to shape the freshly wound material of the inner tube by compression, whereby the inner tube conforms to the shape of the recessed former which results in a reinforcement of the entire body. Preferably the recesses are in the form of elongated grooves, whereby the inner tubes become formed with ribs. A similar reinforcing effect is achieved if reinforcing elements are inserted in the recesses of the former, which elements are adjoined to the subsequently wound inner tube by lining with layered material (laminate), or the ribs are formed by initially winding a fibrous material impregnated with synthetic resin into the recesses prior to winding the layers of the inner tube.

A further method of reinforcing the inner tube is to form the tube with recesses by the compression step, then place reinforcing elements into the corresponding recesses thus formed in the outer surface of the inner tube and join these elements to the tube by synthetic resin impregnated material. There is then applied to the inner tube while it is partially hardened insulation material, for example, shaped parts of rigid foam materials in the form of a honeycomb, and supports or frames for apertures. The rigid insulation material constitutes a reinforcing material for the outer tube which is now formed by enveloping the insulation material, again in criss-cross fashion, several times with a filament and/or a fabric impregnated with synthetic resin, whereby an outer tube results, and by hardening the synthetic resin all these parts thus become interconnected.

In an alternative construction a reinforcement is applied onto the inner tube, the outer tube spaced from the inner tube is wound onto this reinforcement and the intervening space thus arising is filled up with a quantity of foam material, which after foaming and hardening securely joins all of these parts of the body.

These bodies are preferably provided at their ends with reinforcement to facilitate the attachment of an end wall and a door wall, respectively, or if required the interconnection of a number of bodies to form a body unit. Preferably a body, or a body unit, may be mounted on a supporting structure to which it is connected by means of an enveloping material impregnated with synthetic resin, whereby once more the rigidity of the body (or body unit) is increased.

If an aperture, for example, a window is required, then a frame can be applied to the inner tube of the body, and the aperture formed by cutting out, preferably before hardening of the completed body, the parts of the tubes corresponding to the aperture bounded by the frame.

The invention is illustrated in the accompanying drawings in which:

FIG. 1 is a schematic view in perspective of a wound container body;

FIG. 2 is a schematic view in perspective of a wound outer tube of the container body, such outer tube being provided with reinforcements;

FIG. 2A is a view in cross section of the portion of the outer tube which is designated by the reference A in FIG. 2;

Figure 3A:
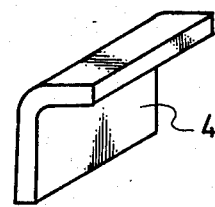
Figure 3:
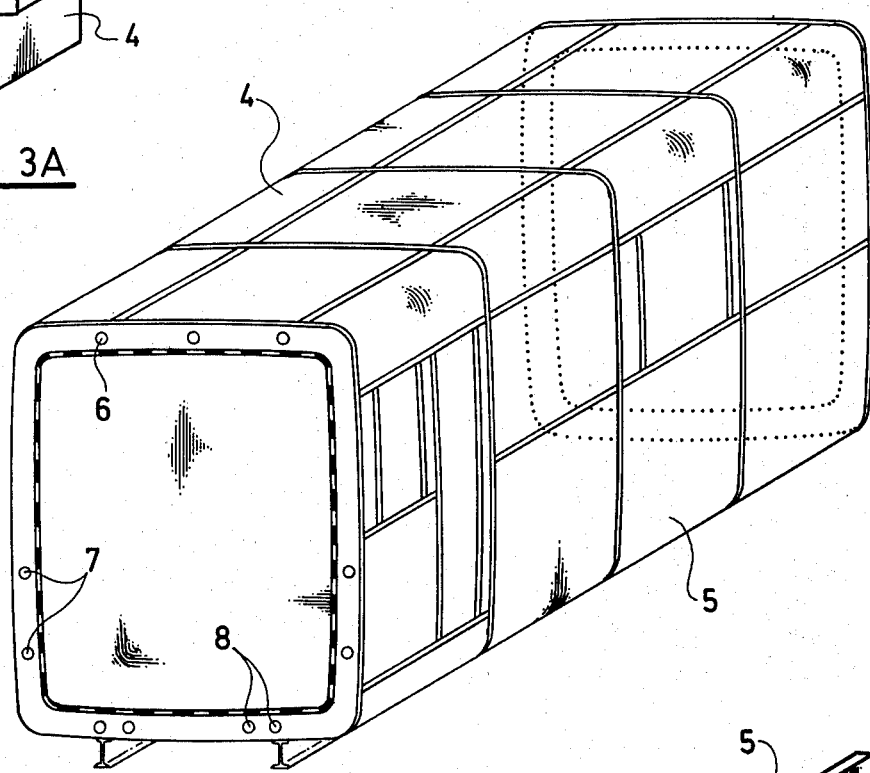
Figure 3B:
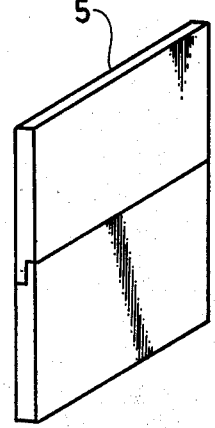
Figure 4:
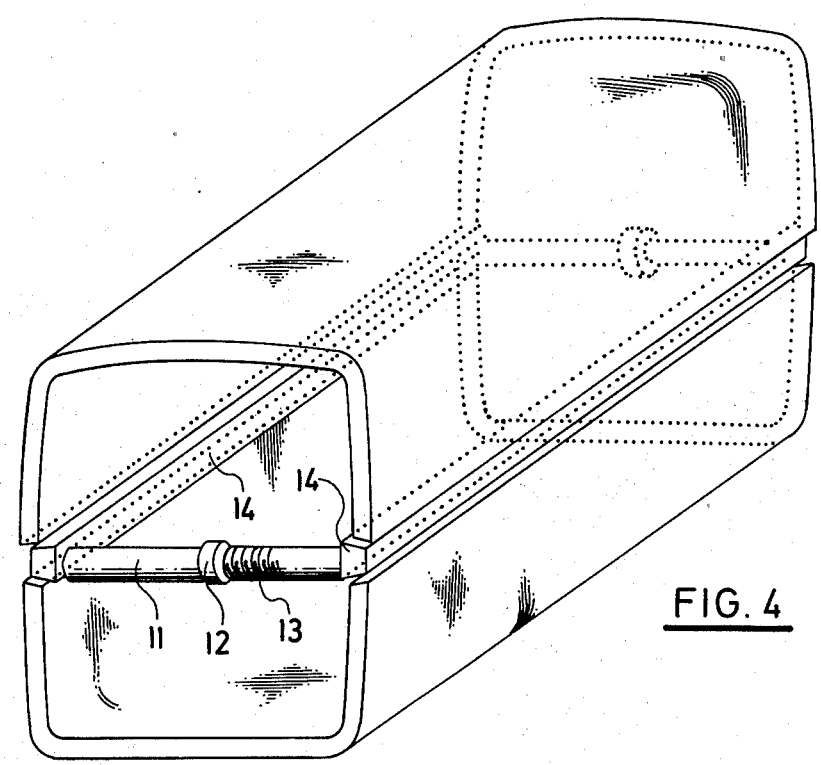
Figure 5:
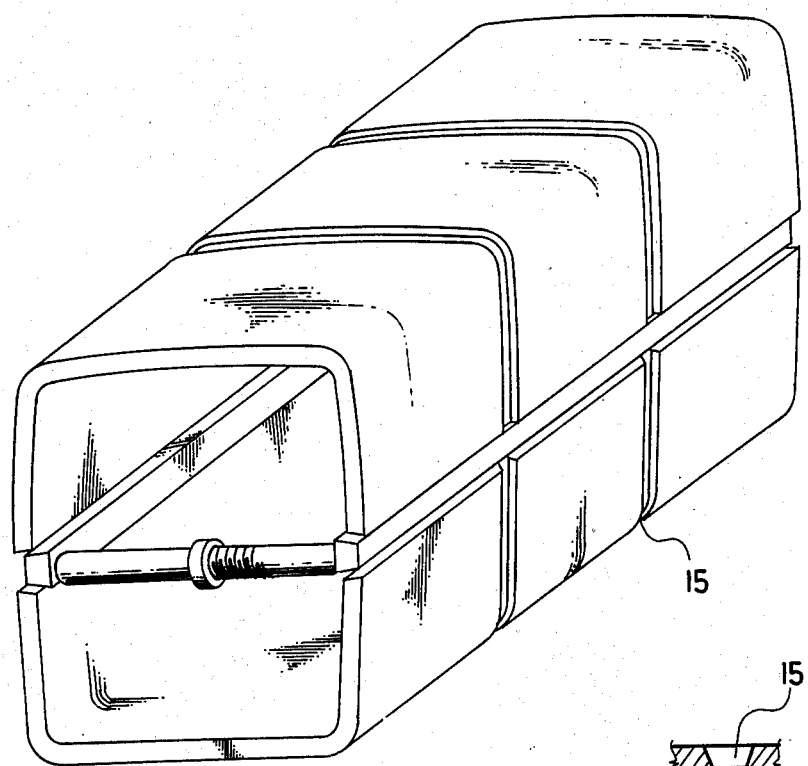

FIG. 2A' is a view in cross section showing the manner of connection of the sections of the tube of FIG. 2;

FIG. 2B is a view in section of a portion of a wall of the outer tube of FIG. 2 at the location designated by B in FIG. 2;

FIG. 3 is a schematic view in perspective of the inner wound laminated tube with reinforcements and filling plates, the outer tube being omitted for clarity of illustration, the view showing installation elements such as electrical elements, and tubes for the provision of water, heating, ventilation, etc.;

FIG. 3A is a view in perspective of a shaped filling plate employed in the inner tube of FIG. 3;

FIG. 3B is a view in perspective of two joined flat filling plates 5 employed in the tube of FIG. 3;

FIG. 4 is a schematic view in perspective of a demountable winding former or mandrel for forming the inner laminated tube; and FIG. 5 is a schematic view in perspective of an alternative demountable winding former or mandrel for the winding of the inner tube, such a mandrel being formed of laminate with stiffening grooves.

Turning now to FIG. 1, the container body of the invention includes an outer tube 1 formed of wound laminate and an inner tube 2 formed of laminate, the inner tube 2 having its floor part provided with built-in welded longitudinally and transversely extending steel profiled sheets of members 3.

In FIGS. 2A and 2A' there are shown, respectively, details of a double partition reinforcement of a section of the outer wound tube and a detail showing the manner of connection of the sections of such tube. In FIG. 2B there is shown a detail of a reinforcement of such outer tube which is disposed at the location B of FIG. 2.

There is shown in FIGS. 3A and 3B, between the inner tube and the outer tube, both made of laminate, there may be installed shaped filling plates 4 (FIG. 3A) flat filling plates 5 (FIG. 3B) or installations of electrical service conduits or ventilation conduits 6, heating conduits 7, and water conduits 8.

For the manufacture of the tubes there is employed a demountable winding former or mandrel, according to FIG. 4. In the parting plane of the winding former there is installed a spacer tube 11, a nut 12, a threaded thrusting rod 13, and thrusting wedges 14, which when members 11, 12 and 13 are shortened, retract to permit the collapse of the winding former.

Figure 5A:
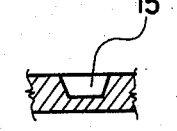

For the manufacture of the stiffened bodies there is used a winding former, as shown in FIG. 5 and FIG. 5A which is provided with grooves 15 for the reception of stiffening members.

The aforedescribed bodies are rigid, easy to manufacture and have a high degree of strength. They are suitable for transportation containers, in particular, for cooled products, and may also be utilized in the production of road and rail vehicles. It will be seen that these bodies provide a vapor barrier, and have substantially no thermal bridges between the inner tube and the outer tube where the reinforcing material is itself an insulator or is constituted by the insulation material. As will be seen from the aforedescribed methods, the manufacture of the bodies can be accomplished in one working operation, so capital investment need not be high. It is thus possible to obtain savings in production manpower, important savings in metals and thus savings in overall cost and weight. Thus it will be appreciated that such bodies and methods of making them can be employed advantageously in the field of transportation.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a method of forming a closed container body which comprises the steps of winding a first plurality of layers of a fibrous, hardenable synthetic resin-impregnated material in criss-cross fashion to form a closed inner container boundary, winding a second plurality of layers of a fibrous, hardenable synthetic resin-impregnated material in criss-cross fashion in radial spaced relation to the inner container boundary to form a closed outer container boundary, arranging an insulating material in the space between the inner and outer container boundaries, and hardening the first and second plurality of layers, the improvement which comprises the steps of forming a pattern of radial ribs on the inner container boundary, and reinforcing the ribbed inner container boundary in a pattern defined by the ribs.

2. A method as defined in claim 1, wherein the insulating material is defined by discrete, preformed insulating elements, wherein the arranging step is accomplished by applying the inner surface of each preformed element against the outer surface of the ribbed inner container boundary before the first plurality of layers is completely hardened, and wherein the step of winding the second plurality of layers is accomplished by wrapping such second plurality around the outer surface of the preformed elements.

3. A method as defined in claim 2, in which the reinforcing step is accomplished by winding a third plurality of layers of a fibrous, hardenable synthetic resin-impregnated material around the outer surface of the preformed elements to urge such elements into the corresponding portions of the outer surface of the inner container boundary.

4. A method as defined in claim 1, in which the ribs formed in the inner container boundary define corresponding pockets in the outer surface of such boundary, in which the insulating material is a hardenable foam, and in which the reinforcing step is accomplished by flowing the hardenable foam into the pockets of the inner container boundary.

5. A method as defined in claim 1, in which the step of winding the first plurality of layers is accomplished by wrapping the first plurality around a circumferentially recessed mandrel and compressing the wrapped first plurality of layers into the grooves of the mandrel.

6. A method as defined in claim 5, in which the reinforcing step is accomplished by laying a pattern of reinforcing elements in the grooves of the mandrel prior to the step of winding the first plurality of layers.

7. In a method of forming a closed container body, the steps of winding a first plurality of layers of a fibrous, hardenable synthetic resin-impregnated material upon an externally grooved mandrel to form an inner container boundary, compressing the inner container boundary into the grooves of the mandrel to define a pattern of ribs and corresponding pockets thereon, applying a reinforcing framework around the ribbed inner container boundary, winding a second plurality of layers of a fibrous, hardenable synthetic resin-impregnated material around the reinforcing framework to form an outer container boundary, flowing a hardenable insulating material into the space between the inner and outer container boundaries to penetrate the pockets of the ribbed inner container boundary and the open spaces in the reinforcing framework, and hardening the penetrated insulating material and the inner and outer container boundaries.

* * * * *